United States Patent
Nakayama

(10) Patent No.: US 10,897,555 B2
(45) Date of Patent: Jan. 19, 2021

(54) INFORMATION PROCESSING APPARATUS TO DETERMINE A LEVEL OF AUTHENTICATION BASED ON INFORMATION RELATED TO A PRINT JOB

(71) Applicant: Ryuichiro Nakayama, Kanagawa (JP)

(72) Inventor: Ryuichiro Nakayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/532,541

(22) Filed: Aug. 6, 2019

(65) Prior Publication Data

US 2020/0106921 A1 Apr. 2, 2020

(30) Foreign Application Priority Data

Sep. 28, 2018 (JP) .................................. 2018-184100

(51) Int. Cl.
*H04N 1/44* (2006.01)
*H04N 1/00* (2006.01)

(52) U.S. Cl.
CPC ....... *H04N 1/4413* (2013.01); *H04N 1/00244* (2013.01)

(58) Field of Classification Search
CPC .................................................... G06F 3/1238
USPC ....................................................... 358/1.14
See application file for complete search history.

(56) References Cited

U.S. PATENT DOCUMENTS

| 9,467,585 | B2 * | 10/2016 | Takeo ................ H04N 1/00875 |
| 10,228,646 | B1 * | 3/2019 | Kenmotsu ............ G06F 3/1213 |
| 2009/0064002 | A1 | 3/2009 | Katsumata et al. |
| 2011/0273738 | A1 | 11/2011 | Tanaka et al. |
| 2018/0270216 | A1 | 9/2018 | Nakayama |
| 2018/0364962 | A1 * | 12/2018 | Ando .................... G06F 3/1274 |

FOREIGN PATENT DOCUMENTS

| JP | 2002-297510 | 10/2002 |
| JP | 2009-054027 | 3/2009 |
| JP | 2009-282667 | 12/2009 |
| JP | 2010-221697 | 10/2010 |

* cited by examiner

*Primary Examiner* — Jacky X Zheng
(74) *Attorney, Agent, or Firm* — Oblon, McClelland, Maier & Neustadt, L.L.P.

(57) ABSTRACT

An information processing apparatus includes circuitry. The circuitry receives information related to a print job requested by a user, and determines whether the information related to the print job meets a previously determined condition. When the user requests an image forming apparatus to execute the print job and it is determined that the information related to the print job meets the previously determined condition, the circuitry executes a first authentication process for the user. When the user requests the image forming apparatus to execute the print job and it is determined that the information related to the print job fails to meet the previously determined condition, the circuitry executes a second authentication process for the user. The second authentication process is different at least partly from the first authentication process.

14 Claims, 10 Drawing Sheets

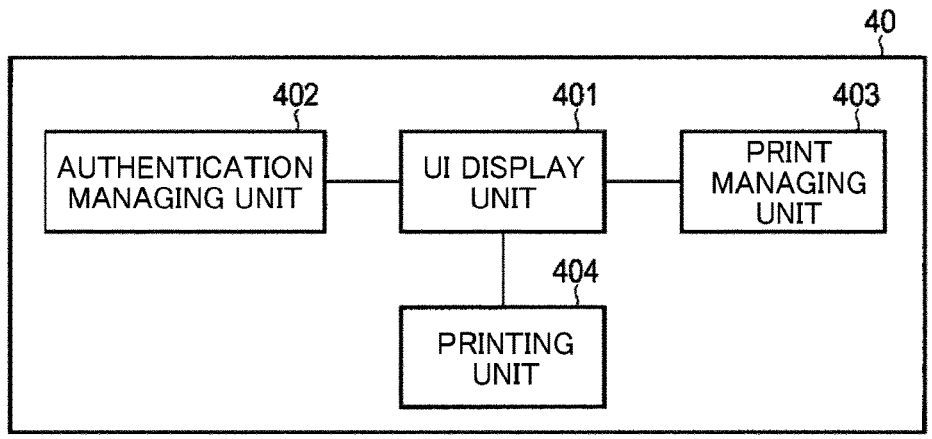

INFORMATION PROCESSING APPARATUS TO DETERMINE A LEVEL OF AUTHENTICATION BASED ON INFORMATION RELATED TO A PRINT JOB

CROSS-REFERENCE TO RELATED APPLICATION

This patent application is based on and claims priority pursuant to 35 U.S.C. § 119(a) to Japanese Patent Application No. 2018-184100 filed on Sep. 28, 2018 in the Japan Patent Office, the entire disclosure of which is hereby incorporated by reference herein.

BACKGROUND

Technical Field

The present invention relates to an information processing apparatus, an image forming system, and a non-transitory recording medium.

Description of the Related Art

There is a widely used image forming apparatus with the function of a printer that prints a file in printable format, such as a document file, for example.

Such an image forming apparatus executes a print job (i.e., printing process) requested by a user operating a user terminal, for example, to thereby print a file specified by the user.

In recent years, some image forming apparatuses ask a user to input therein a user identification (ID) or password, for example, to use the image forming apparatuses (e.g., to print a file). With the user ID or password input by the user, an authentication process of authenticating the user is executed, thereby reducing security risks such as information leakage.

Whereas the above-described authentication process includes a variety of authentication processes, the authentication process executed when the user uses the image forming apparatus is previously determined and difficult to flexibly change.

SUMMARY

In one embodiment of this invention, there is provided an improved information processing apparatus that includes, for example, circuitry. The circuitry receives information related to a print job requested by a user, and determines whether the information related to the print job meets a previously determined condition. When the user requests an image forming apparatus to execute the print job and it is determined that the information related to the print job meets the previously determined condition, the circuitry executes a first authentication process for the user. When the user requests the image forming apparatus to execute the print job and it is determined that the information related to the print job fails to meet the previously determined condition, the circuitry executes a second authentication process for the user. The second authentication process is different at least partly from the first authentication process.

In one embodiment of this invention, there is provided an image forming system that includes, for example, an image forming apparatus and an information processing apparatus. The image forming apparatus executes a print job requested by a user. The information processing apparatus is communicably connected to the image forming apparatus. In response to a request from the user using the image forming apparatus, the image forming system transmits a request to authenticate the user from the image forming apparatus to the information processing apparatus. When identification information related to the user is stored in the information processing apparatus, the image forming system executes a first authentication process in the information processing apparatus. When the identification information related to the user is absent in the information processing apparatus, the image forming system executes a second authentication process in the information processing apparatus. The second authentication process is different at least partly from the first authentication process. Based on an authentication result transmitted to the image forming apparatus from the information processing apparatus, the image forming system executes printing of the print job in the image forming apparatus.

In one embodiment of this invention, there is provided a non-transitory recording medium storing a plurality of instructions which, when executed by one or more processors, cause the processors to perform an information processing method. The information processing method includes, for example, receiving information related to a print job requested by a user, determining whether the information related to the print job meets a previously determined condition, executing a first authentication process for the user when the user requests an image forming apparatus to execute the print job and it is determined that the information related to the print job meets the previously determined condition, and executing a second authentication process for the user when the user requests the image forming apparatus to execute the print job and it is determined that the information related to the print job fails to meet the previously determined condition. The second authentication process is different at least partly from the first authentication process.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7 is a block diagram illustrating an example of the functional configuration of the image forming apparatus of the embodiment;

FIG. 8 is a diagram illustrating an example of the data structure of rule information stored in a rule information storing unit of the print server of the embodiment;

FIG. 9 is a diagram illustrating an example of the data structure of authentication information stored in an authentication information storing unit of the authentication server of the embodiment;

Figure 1:
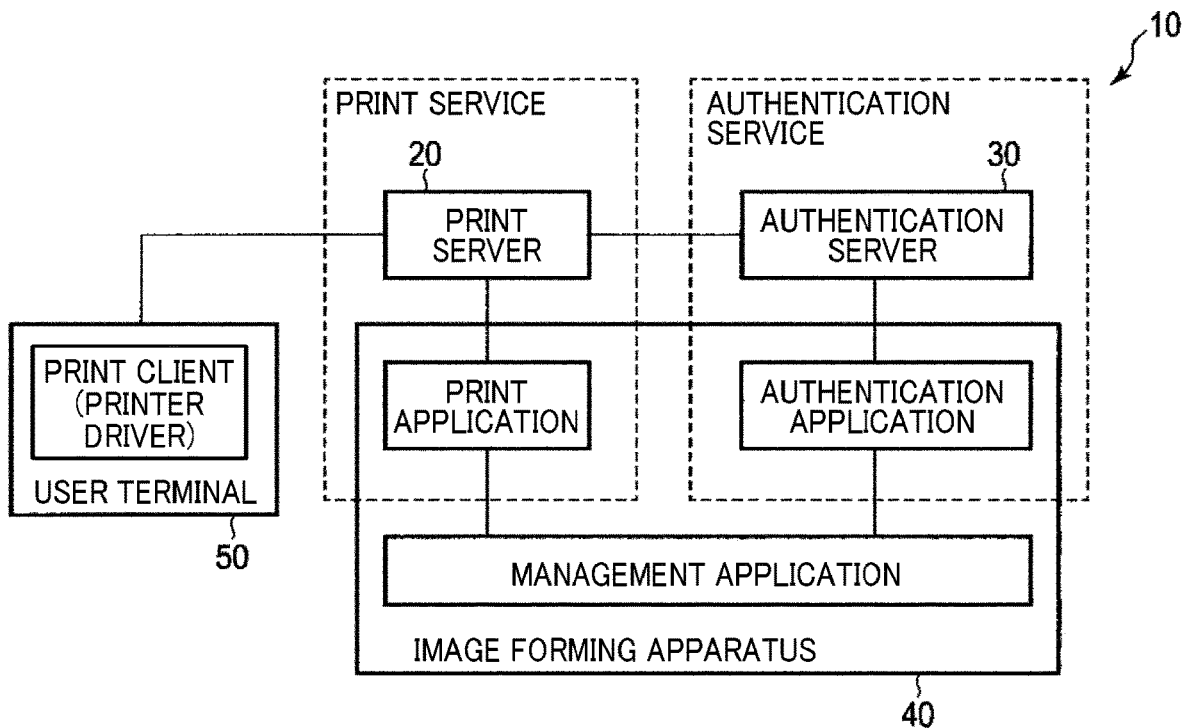
FIG. 1 is a diagram illustrating an example of the configuration of an image forming system of an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An embodiment of the present invention will be described below with reference to the drawings.

A configuration example of an image forming system (i.e., a network system) of the embodiment will first be described with reference to FIG. 1.

As illustrated in FIG. 1, an image forming system 10 includes a print server 20, an authentication server 30, and an image forming apparatus 40.

The print server 20 is an information processing apparatus for providing a print service to a user of the image forming apparatus 40 (i.e., the image forming system 10) together with the image forming apparatus 40, which executes an embedded application program for printing a file in printable format (hereinafter referred to as the print application). Herein, the print service refers to a service enabling printing of a file specified by the user of the image forming apparatus 40. Further, the file in printable format may be a portable document format (PDF) file, a Word (registered trademark) file, or a joint photographic experts group (JPEG) file, for example, but may be a file in another format.

The authentication server 30 is an information processing apparatus for providing an authentication service to the user of the image forming apparatus 40 (i.e., the image forming system 10) together with the image forming apparatus 40, which executes an embedded application program for authenticating the user (hereinafter referred to as the authentication application). Herein, the authentication service refers to a service enabling authentication of the user who uses the image forming apparatus 40 (i.e., receives the print service). Further, the authentication of the user refers to determining whether the user is duly authorized to use the image forming apparatus 40 (i.e., whether to allow the user to use the image forming apparatus 40).

In the image forming system 10 of the embodiment, the print server 20 and the authentication server 30 are communicably connected to each other. In the embodiment, the communication between the print server 20 and the authentication server 30 takes place in a secure state in which security is ensured with a digital certificate, for example.

The following description of the embodiment will be given on the assumption that the print server 20 and the authentication server 30 are separate apparatuses. The print server 20 and the authentication server 30, however, may be implemented as one apparatus (i.e., one information processing apparatus).

Further, the print server 20 may be implemented as a print server application program installed in an information processing apparatus such as a personal computer (PC), for example, to cause the information processing apparatus to operate as the print server 20. Similarly, the authentication server 30 may be implemented as an authentication server application program installed in an information processing apparatus such as a PC to cause the information processing apparatus to operate as the authentication server 30.

The image forming apparatus 40 is communicably connected to each of the print server 20 and the authentication server 30, and has the function of a printer that prints a variety of files. The image forming apparatus 40 may be implemented as an apparatus called multifunction peripheral (MFP) with a plurality of functions including, for example, a copier function, a scanner function, and a facsimile function, as well as the printer function.

The image forming apparatus 40 further executes an embedded application program for managing the overall operation of the image forming apparatus 40 (hereinafter referred to as the management application), for example, as well as the print application for providing the print service and the authentication application for providing the authentication service.

The print application, the authentication application, and the management application may be separate application programs, or may be installed in the image forming apparatus 40 as one application program.

Although FIG. 1 illustrates a single image forming apparatus 40, the image forming system 10 of the embodiment may include a plurality of image forming apparatuses 40. In this case, each of the plurality of image forming apparatuses 40 is communicably connected to the print server 20 and the authentication server 30.

As illustrated in FIG. 1, the print server 20 is communicably connected to a user terminal 50, which is operated by the user. It is assumed here that the user terminal 50 is a PC, for example. The user terminal 50, however, may be another type of electronic apparatus such as a smartphone or a tablet terminal. The user terminal 50 runs software called a print client or printer driver to receive the print service.

The user specifies a file to be printed by operating the user terminal 50, to thereby request a print job for printing the file (i.e., request printing of the file). In this case, the print job requested by the user is stored in the print server 20.

With the print job thus stored in the print server 20, the user is able to instruct execution of the print job by operating the image forming apparatus 40. In this case, the image forming apparatus 40 acquires the stored print job from the print server 20 and executes the acquired print job to print the file.

When the user uses the image forming apparatus 40, the authentication server 30 executes an authentication process for the user (i.e., a process for authenticating the user). In other words, the user is allowed to use the image forming apparatus 40 when authenticated by the authentication process executed by the authentication server 30.

The authentication process for authenticating the user includes, for example, an integrated circuit (IC) card authentication process based on information acquired from an information storage medium such as an IC card and a passcode authentication process based on a passcode or the like input by the user. Executing a combination of these multiple authentication processes (i.e., multifactor authentication) is higher in security strength than executing one of the authentication processes.

However, if the security strength is increased by combining the IC card authentication process and the passcode authentication process, for example, the user is asked to input the passcode or the like as well as to bring the IC card close to a card reader of the image forming apparatus 40 (i.e., hold the IC card over the card reader). Such a system is troublesome (i.e., inconvenient) for the user.

On the other hand, if the authentication process is limited to the IC card authentication process, for example, the user is asked only to bring the IC card close to (i.e., hold the IC card over) the card reader of the image forming apparatus 40. This system is therefore convenient, but makes it difficult to operate the image forming system 10 with high security strength.

The security strength is desired to be increased, or is desired to be reduced with priority given to convenience, depending on factors such as the user of the image forming apparatus 40, the file (i.e., the document contained therein) to be printed with the image forming apparatus 40, and the location at which the image forming apparatus 40 is installed (i.e., the environment in which the file is printed), for example.

In a typical image forming system, however, the authentication process executed when a user uses an image forming apparatus is previously determined, making it difficult to flexibly change the security strength (i.e., change the authentication process).

In view of this, the present embodiment provides a configuration for executing at least partly different authentication processes depending on the print job requested by the user (i.e., a configuration for changing the authentication process to be executed for the user).

A detailed description will be given below of the image forming system 10 including an information processing apparatus according to the embodiment. It is assumed here that the authentication server 30 illustrated in FIG. 1 corresponds to the information processing apparatus according to the embodiment. The information processing apparatus according to the embodiment, however, may be a concept including the print server 20.

Figure 2:
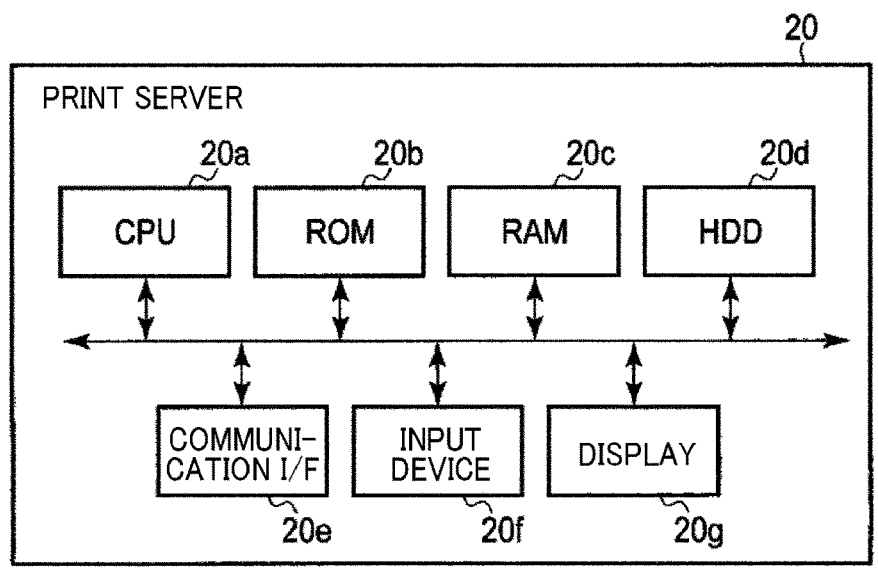
FIG. 2 is a diagram illustrating an example of the hardware configuration of a print server forming the image forming system of the embodiment.

FIG. 2 illustrates an example of the hardware configuration of the print server 20 illustrated in FIG. 1. As illustrated in FIG. 2, the print server 20 includes a central processing unit (CPU) 20a, a read only memory (ROM) 20b, a random access memory (RAM) 20c, a hard disk drive (HDD) 20d, a communication interface (I/F) 20e, an input device 20f, and a display 20g, for example, which are connected to a system bus.

The CPU 20a is a processor that controls the respective operations of components of the print server 20. The CPU 20a executes various programs stored in storage devices such as the ROM 20b and the HDD 20d by using the RAM 20c as a work area. The programs executed by the CPU 20a include an operating system (OS) and a variety of application programs including the aforementioned print server application program.

FIG. 2 illustrates the print server 20 including the HDD 20d. The print server 20, however, may include another storage device such as a solid state drive (SSD), for example.

The communication I/F 20e is an interface for wired or wireless communication with an external device, for example. In the following description, the print server 20 communicates with each of the authentication server 30, the image forming apparatus 40, and the user terminal 50 via the communication I/F 20e.

The input device 20f includes a keyboard and a mouse, for example, to receive input of an operation performed by a later-described administrator of the image forming system 10 (e.g., the print server 20), for example. The display 20g may be a liquid crystal display (LCD) or an organic electro luminescence (EL) display, for example.

Figure 3:
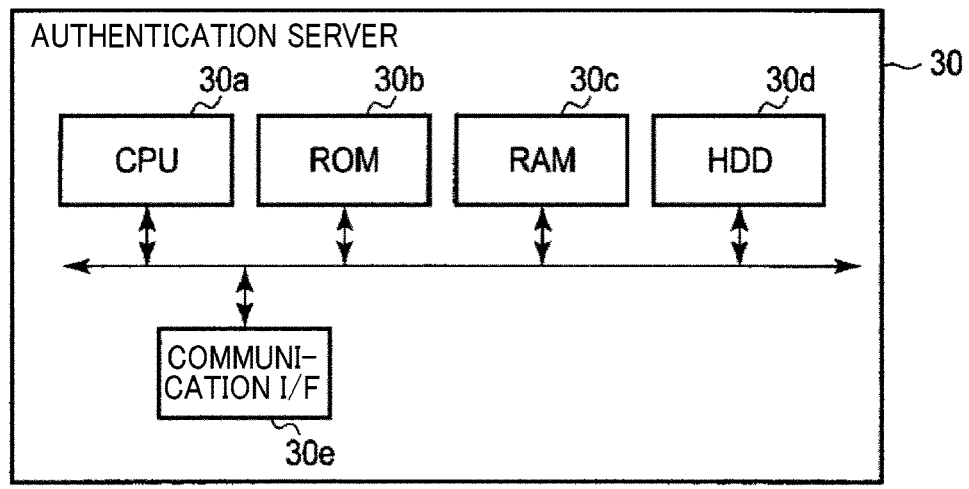
FIG. 3 is a diagram illustrating an example of the hardware configuration of an authentication server forming the image forming system of the embodiment.

FIG. 3 illustrates an example of the hardware configuration of the authentication server 30 illustrated in FIG. 1. As illustrated in FIG. 3, the authentication server 30 includes a CPU 30a, a ROM 30b, a RAM 30c, an HDD 30d, and a communication I/F 30e, for example, which are connected to a system bus.

The CPU 30a is a processor that controls the respective operations of components of the authentication server 30. The CPU 30a executes various programs stored in storage devices such as a ROM 30b and the HDD 30d by using the RAM 30c as a work area. The programs executed by the CPU 30a include an OS and a variety of application programs including the aforementioned authentication server application program.

The authentication server 30 may include another storage device such as an SSD, for example, similarly to the print server 20 illustrated in FIG. 2.

The communication I/F 30e is an interface for wired or wireless communication with an external device, for example. In the following description, the authentication server 30 communicates with each of the print server 20 and the image forming apparatus 40 via the communication I/F 30e.

The authentication server 30 described above includes the CPU 30a, the ROM 30b, the RAM 30c, the HDD 30d, and the communication I/F 30e, but may further include other devices such as an input device and a display similarly to the above-described print server 20.

Figure 4:
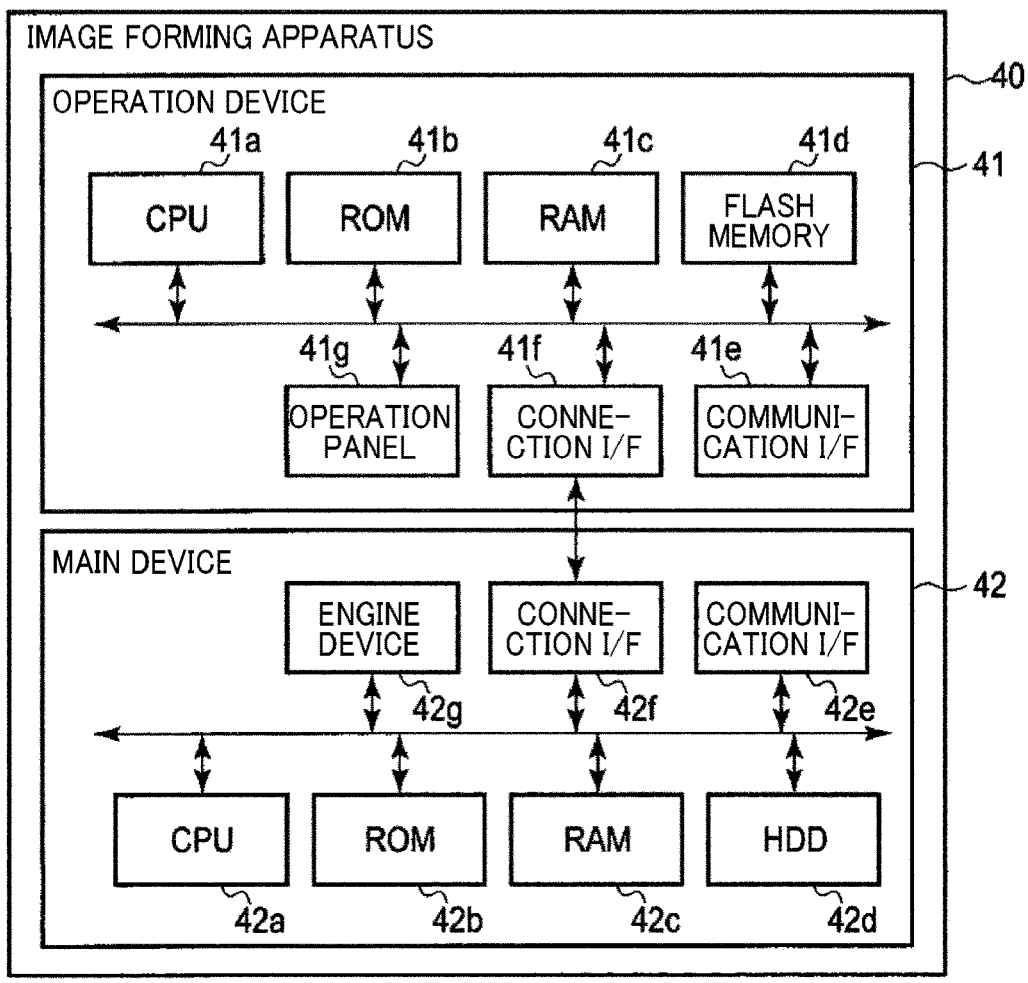
FIG. 4 is a diagram illustrating an example of the hardware configuration of an image forming apparatus forming the image forming system of the embodiment.

FIG. 4 illustrates an example of the hardware configuration of the image forming apparatus 40 illustrated in FIG. 1. It is assumed in the following description that the image forming apparatus 40 is implemented as the aforementioned MFP. As illustrated in FIG. 4, the image forming apparatus 40 includes an operation device 41 and a main device 42.

The operation device 41 receives an operation performed on the image forming apparatus 40 by the user. The operation device 41 includes a CPU 41a, a ROM 41b, a RAM 41c, a flash memory 41d, a communication I/F 41e, a connection I/F 41f, and an operation panel 41g, for example, which are connected to a system bus.

The CPU 41a is a processor that controls the respective operations of components of the operation device 41. The CPU 41a executes various programs stored in storage devices such as the ROM 41b and the flash memory 41d by using the RAM 41c as a work area. The programs executed by the CPU 41a include an OS and a variety of application programs.

The communication I/F 41e is an interface for wired or wireless communication with an external device, for example.

The connection I/F 41f is an interface for communication with the main device 42 via a communication path. The communication path between the operation device 41 and the main device 42 may conform to the universal serial bus (USB) standard, for example. The communication path between the operation device 41 and the main device 42 may be a wired or wireless communication path, and may be based on another standard.

The operation panel 41g includes a touch screen display, for example. The touch screen display incorporates therein a flat panel display and a touch panel, for example. The flat panel display is formed as an LCD or an organic EL display, for example. The touch panel is configured to detect a contact position on a screen of the flat panel display contacted by a finger, for example. The thus-configured operation panel 41g receives input of a variety of instructions in accordance with the user operation, and displays a variety of information. The operation panel 41g may include operation buttons such as hardware keys and a display device such as a lamp.

The main device 42 operates in response to the user operation (i.e., instruction) received by the operation device 41. The main device 42 includes a CPU 42a, a ROM 42b, a RAM 42c, an HDD 42d, a communication I/F 42e, a connection I/F 42f, and an engine device 42g, for example, which are connected to a system bus.

The CPU 42a is a processor that controls the respective operations of components of the main device 42. The CPU 42a executes various programs stored in storage devices such as the ROM 42b and the HDD 42d by using the RAM 42c as a work area. The programs executed by the CPU 42a include an OS and a variety of application programs. The application programs executed by the CPU 42a include the print application, the authentication application, and the management application described above.

In FIG. 4, the main device 42 includes the HDD 42d, but may include another storage device such as an SSD, for example.

The communication I/F 42e is an interface for wired or wireless communication with an external device, for example.

The connection I/F 42f is an interface for communication with the operation device 41 via the above-described communication path.

The engine device 42g is hardware that performs processes for implementing functions such as the printer function, the copier function, the scanner function, and the facsimile function other than general information processing and communication. The engine device 42g includes, for example, a plotter that performs printing on a sheet material such as paper, a scanner that scans and reads a document, and a facsimile device that performs facsimile communication. The engine device 42g may further include a finisher that sorts printed sheet materials and an automatic document feeder (ADF) that automatically feeds documents.

In the embodiment, the operation device 41 and the main device 42 operate independently from each other on separate OSs (i.e., on separate software applications) to maintain functional independence from each other. For example, the OS of the operation device 41 may be Android (registered trademark), and the OS of the main device 42 may be Linux (registered trademark). In the embodiment, the operation device 41 and the main device 42 operate independently from each other on separate OSs, as described above, but may be integrated together to operate on one OS.

Further, the main device 42 includes a housing that houses the above-described hardware components. The operation device 41 may be implemented as a tablet terminal to be attached to the exterior of the housing of the main device 42, or may be incorporated inside the housing, for example.

Further, the CPU 42a of the main device 42 executes the print application, the authentication application, and the management application, as described above. Alternatively, the print application, the authentication application, and the management application may be at least partially executed by the CPU 41a of the operation device 41 if such a configuration is capable of implementing later-described functions of the image forming apparatus 40.

Further, the communication between the image forming apparatus 40 and each of the print server 20 and the authentication server 30 takes place via the communication I/F 41e of the operation device 41, but may take place via the communication I/F 42e of the main device 42.

A description will be given below of functional configurations of the print server 20, the authentication server 30, and the image forming apparatus 40 included in the image forming system 10 of the embodiment.

Figure 5:
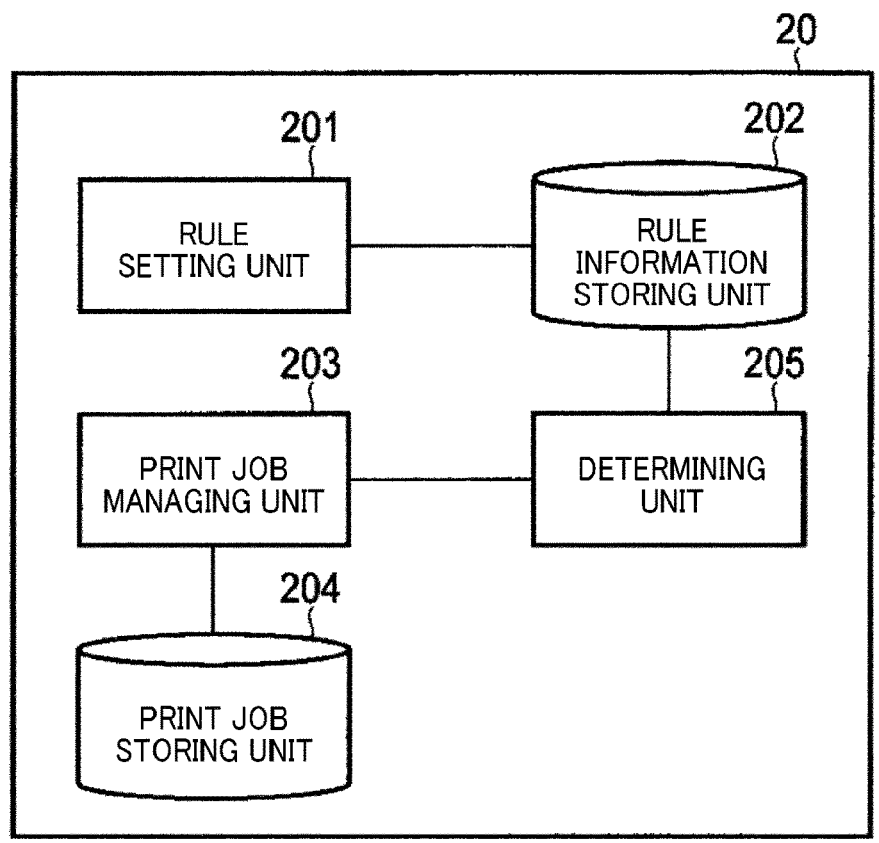
FIG. 5 is a block diagram illustrating an example of the functional configuration of the print server of the embodiment.

FIG. 5 illustrates an example of the functional configuration of the print server 20. As illustrated in FIG. 5, the print server 20 includes a rule setting unit 201, a rule information storing unit 202, a print job managing unit 203, a print job storing unit 204, and a determining unit 205.

It is assumed in the embodiment that a part or all of the rule setting unit 201, the print job managing unit 203, and the determining unit 205 are implemented by software. i.e., by causing the CPU 20a illustrated in FIG. 2 (i.e., the computer of the print server 20) to execute the print server application program. The print server application program may be previously stored in a computer-readable storage medium and distributed, for example. Alternatively, the print server application program may be downloaded to the print server 20 via a network, for example.

A part or all of the rule setting unit 201, the print job managing unit 203, and the determining unit 205 may be implemented by hardware such as an IC or by a combination of software and hardware.

The rule information storing unit 202 and the print job storing unit 204 are implemented by the HDD 20d illustrated in FIG. 2 or by another storage device.

Based on an operation performed on the print server 20 by the administrator of the image forming system 10, the rule setting unit 201 sets rules for changing the authentication process to be executed for the user of the image forming apparatus 40 (i.e., changing the security strength to be applied to the user).

The rule information storing unit 202 stores rule information representing the rules set by the rule setting unit 201. The rule information stored in the rule information storing unit 202 includes conditions specified by the administrator.

To print a file managed in the user terminal 50, for example, the user specifies the file on the user terminal 50 to thereby request a print job for printing the file.

In response to the thus-made print job request from the user, the print job managing unit 203 receives and stores the print job in the print job storing unit 204. The print job managing unit 203 has a function of managing the print job stored in the print job storing unit 204.

The determining unit 205 determines whether information related to the print job requested by the user meets the conditions included in the rule information stored in the rule information storing unit 202. A result of determination by the determining unit 205 is transmitted to the authentication server 30.

Figure 6:
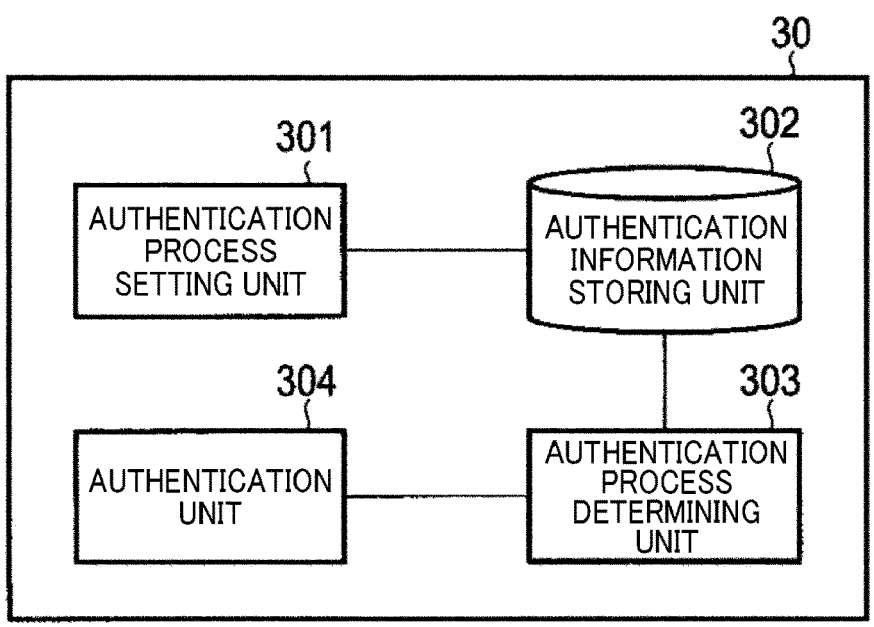
FIG. 6 is a block diagram illustrating an example of the functional configuration of the authentication server of the embodiment.

FIG. 6 illustrates an example of the functional configuration of the authentication server 30. As illustrated in FIG. 6, the authentication server 30 includes an authentication process setting unit 301, an authentication information storing unit 302, an authentication process determining unit 303, and an authentication unit 304.

It is assumed in the embodiment that a part or all of the authentication process setting unit 301, the authentication process determining unit 303, and the authentication unit 304 are implemented by software, i.e., by causing the CPU 30a illustrated in FIG. 3 (i.e., the computer of the authentication server 30) to execute the authentication server application program. The authentication server application program may be previously stored in a computer-readable storage medium and distributed, for example. Alternatively, the authentication server application program may be downloaded to the authentication server 30 via a network, for example.

A part or all of the authentication process setting unit 301, the authentication process determining unit 303, and the authentication unit 304 may be implemented by hardware such as an IC or by a combination of software and hardware.

The authentication information storing unit 302 is implemented by the HDD 30d illustrated in FIG. 3 or by another storage device.

The authentication process setting unit 301 receives the above-described result of determination made by the determining unit 205 of the print server 20. In accordance with the received determination result, the authentication process setting unit 301 sets the authentication process to be executed for the user requesting the print job stored in the print job storing unit 204 of the print server 20.

The authentication information storing unit 302 stores authentication information representing the authentication process set by the authentication process setting unit 301.

For example, it is assumed here that the user uses the image forming apparatus 40 to print the file after the print job requested by the user is stored in the print job storing unit 204 of the print server 20 as described above. In this case, for example, a user ID as identification information for identifying the user of the image forming apparatus 40 is transmitted to the authentication sever 30 from the image forming apparatus 40.

Based on the authentication information stored in the authentication information storing unit 302 and the user ID transmitted from the image forming apparatus 40, the authentication process determining unit 303 determines the authentication process to be executed for the user identified by the user ID.

The authentication unit 304 executes the authentication process determined by the authentication process determining unit 303. If the user is authenticated by the authentication process executed by the authentication unit 304, the user is allowed to use the image forming apparatus 40 (i.e., to print the file with the image forming apparatus 40).

FIG. 7 illustrates an example of the functional configuration of the image forming apparatus 40. The image forming apparatus 40 of the embodiment is implemented as the MFP with a plurality of functions such as the printer function, the copier function, the scanner function, and the facsimile function, as described above. The following description with reference to FIG. 7, however, will focus on functional units related to the printer function, i.e., the function of the image forming apparatus 40 as a printer.

As illustrated in FIG. 7, the image forming apparatus 40 includes a user interface (UI) display unit 401, an authentication managing unit 402, a print managing unit 403, and a printing unit 404.

It is assumed in the embodiment that a part or all of the UI display unit 401, the authentication managing unit 402, the print managing unit 403, and the printing unit 404 are implemented by software, i.e., by causing the CPU 42a of the main device 42 illustrated in FIG. 4, for example, to execute various applications (i.e., the print application, the authentication application, and the management application). These applications (i.e., application programs) may be previously stored in a computer-readable storage medium and distributed, for example. Alternatively, the applications may be downloaded to the image forming apparatus 40 via a network, for example.

A part or all of the UI display unit 401, the authentication managing unit 402, the print managing unit 403, and the printing unit 404 may be implemented by hardware such as an IC or by a combination of software and hardware.

The UI display unit 401 has functions of displaying a variety of screens on the touch screen display of the operation panel 41g and receiving the user operation performed on the operation panel 41g.

When the user uses the image forming apparatus 40, the authentication managing unit 402 acquires the user ID for identifying the user. The user ID acquired by the authentication managing unit 402 is transmitted to the authentication server 30 from the image forming apparatus 40.

The print managing unit 403 acquires the print job specified in accordance with the user operation received by the UI display unit 401 (i.e., performed on the operation panel 41g) from print jobs stored in the print server 20. The print managing unit 403 issues a print instruction based on the acquired print job.

The printing unit 404 executes the print job (i.e., the printing process) in response to the print instruction from the print managing unit 403.

FIG. 8 illustrates an example of the data structure of the rule information stored in the rule information storing unit 202 of the print server 20.

As illustrated in FIG. 8, the rule information includes a change condition and authentication process information in association with each other. The change condition is applied to the information related to the print job requested by the user, and is used to change the authentication process that is executed when the user requesting the print job uses the image forming apparatus 40.

The change condition includes, for example, a first condition related to the user, a second condition related to the file to be printed based on the print job, and a third condition related to the image forming apparatus 40 that prints the file.

For example, a user group (i.e., the name of the user group) is set as the first condition. In this case, if the user requesting the print job belongs to the user group set as the first condition, the first condition is met.

Further, for example, an application program (i.e., the name of the application program) is set as the second condition. In this case, if the application program associated with the file to be printed based on the print job is the application program set as the second condition, the second condition is met. The application program associated with the file to be printed based on the print job refers to, for example, the application program of the source of the print request capable of handling the file. In other words, the application program set as the second condition corresponds to, for example, the format (i.e., type) of the file to be printed based on the print job.

Further, for example, the installation location is set as the third condition. In this case, if the image forming apparatus 40 that prints the file based on the print job is installed at the installation location set as the third condition, the third condition is met.

The authentication process information is information (e.g., identifier) representing the authentication process to be executed for the user requesting the print job meeting the change condition (e.g., the first to third conditions) associated with the authentication process information.

In the example illustrated in FIG. 8, the rule information storing unit 202 stores rule information 202a, rule information 202b, and rule information 202c.

The rule information 202a includes the change condition and the authentication process information in association with each other. The change condition of the rule information 202a includes, for example, "group G1," "application A1," and "office" as the first condition, the second condition, and the third condition, respectively. The authentication process information of the rule information 202a represents an authentication process P1. According to the rule information 202a, when the user requesting the print job belongs to the group G1, the application program associated with the file to be printed based on the print job is the application A1, and the installation location of the image forming apparatus 40 that is to print the file is the office, the authentication process P1 is executed for the user. In other words, according to the rule information 202a, when the first to third conditions included in the rule information 202a are met, the authentication process to be executed for the user is changed to the authentication process P1.

The rule information 202b similarly includes the change condition and the authentication process information in association with each other. The change condition of the rule information 202b includes, for example, "group G2," "application A2," and "headquarter" as the first condition, the second condition, and the third condition, respectively. The authentication process information of the rule information 202b represents the authentication process P1. According to the rule information 202b, when the user requesting the print job belongs to the group G2, the application program associated with the file to be printed based on the print job is the application A2, and the installation location of the image forming apparatus 40 that is to print the file is the headquarter, the authentication process P1 is executed for the user. In other words, according to the rule information 202b, when the first to third conditions included in the rule information 202b are met, the authentication process to be executed for the user is changed to the authentication process P1.

The rule information 202c also includes the change condition and the authentication process information in association with each other. The change condition of the rule information 202c includes, for example, "group G3," "application A3," and "public place" as the first condition, the second condition, and the third condition, respectively. The authentication process information of the rule information 202c represents the authentication process P1. According to the rule information 202c, when the user requesting the print job belongs to the group G3, the application program associated with the file to be printed based on the print job is the application A3, and the installation location of the image forming apparatus 40 that is to print the file is the public place, the authentication process P1 is executed for the user. In other words, according to the rule information 202c, when the first to third conditions included in the rule information 202c are met, the authentication process to be executed for the user is changed to the authentication process P1.

In the example illustrated in FIG. 8, the rule information 202a, the rule information 202b, and the rule information 202c include the same authentication process information. However, the respective authentication process information items included in the rule information 202a, the rule information 202b, and the rule information 202c may represent different authentication processes.

Further, in the above-described example of FIG. 8, the rule information storing unit 202 stores three rule information items (i.e., the rule information 202a, the rule information 202b, and the rule information 202c). However, the number of rule information items stored in the rule information storing unit 202 may be any other number equal to or greater than one.

In the embodiment, the authentication process represented by the authentication process information included in the rule information is at least partly different from the authentication process set by default, for example (i.e., the authentication process executed for the user requesting the print job not meeting the change condition). Specifically, the authentication process represented by the authentication process information included in the rule information is higher in security strength than the authentication process set by default.

According to the above-described rule information, when printing a file based on a print job meeting the change condition included in the rule information, an authentication process of high security strength is executed for the user on the assumption that the file contains a confidential document, for example. When printing a file based on a print job not meeting the change condition included in the rule information, an authentication process of low security strength is executed for the user with priority given to the convenience of the user.

In the above-described example, the user group, the application, and the installation location are set as the first condition, the second condition, and the third condition, respectively. However, this example is illustrative, and other conditions may be set as the first to third conditions.

Further, the change condition included in the rule information may include at least one of the first to third conditions, or may include another condition other than the first to third conditions.

FIG. 9 illustrates an example of the data structure of the authentication information stored in the authentication information storing unit 302 of the authentication server 30.

As illustrated in FIG. 9, the authentication information includes the user ID and the authentication process information in association with each other. The user ID is identification information for identifying the user of the image forming apparatus 40.

The authentication process information is information (e.g., identifier) representing the authentication process that is executed when the user identified by the user ID associated with the authentication process information uses the image forming apparatus 40 (i.e., when the file is printed based on the print job requested by the user).

In the example illustrated in FIG. 9, the authentication information storing unit 302 stores authentication information 302a and authentication information 302b.

The authentication information 302a stores, for example, a user ID "UA" and the authentication process information "authentication process P1" in association with each other. The authentication information 302a indicates that the authentication process P1 is executed when a user identified by the user ID "UA" uses the image forming apparatus 40.

The authentication information 302b stores, for example, a user ID "UB" and the authentication process information "authentication process P1" in association with each other. The authentication information 302b indicates that the authentication process P1 is executed when a user identified by the user ID "UB" uses the image forming apparatus 40.

In the above-described example, the authentication information storing unit 302 stores the authentication information 302a and the authentication information 302b. The authentication information storing unit 302, however, may store authentication information including another user ID.

An operation of the image forming system 10 of the embodiment will be described below. The following description will focus on a rule setting process of setting the rules for changing the authentication process for the user, a print job storage process of storing the print job requested by the user, and a file printing process of printing the file based on the print job.

An example of the procedure of the rule setting process will first be described with reference to the sequence chart of FIG. 10.

To set the rules for changing the authentication process for the user, the administrator of the image forming system 10 inputs an administrator ID and a password to the print server 20 with the input device 20f of the print server 20, for example (step S1). The administrator ID is identification information for identifying the administrator, and the password is previously assigned to the administrator.

In this case, the print server 20 executes a login process based on the administrator ID and the password input at step S1 (step S2). The login process determines whether the administrator ID and the password input at step S1 match the administrator ID and the password managed in the print server 20 (or the authentication server 30), for example.

Following the execution of the process of step S2, a login process result representing a result of the determination at step S2 is displayed on the display 20g of the print server 20 (step S3).

If it is determined that the administrator ID and the password input at step S1 match the administrator ID and the password managed in the print server 20, the display 20g displays at step S3 a login process result indicating successful login of the administrator to the print server 20 (i.e., the image forming system 10).

If it is determined that the administrator ID and the password input at step S1 do not match the administrator ID and the password managed in the print server 20, the display 20g displays at step S3 a login process result indicating failed login of the administrator to the print server 20 (i.e., the image forming system 10). In this case, the administrator is allowed to input the administrator ID and the password again. That is, the process of step S1 is executed again.

If the display 20g displays at step S3 the login process result indicating the login success of the administrator, the administrator operates the print server 20 to request the print server 20 to display a rule setting screen for setting the above-described rules (step S4).

It is assumed here that information for use in setting the rules is managed in the authentication server 30. The information for use in setting the rules includes, for example, externally-specifiable authentication process information representing the authentication process selectable in setting the rules and option information selectable as conditions for executing the authentication process.

In response to the execution of the process of step S4, the rule setting unit 201 of the print server 20 requests the authentication server 30 to acquire the authentication process information (step S5).

In this case, in response to the request from the rule setting unit 201, the authentication server 30 transmits the authentication process information managed in the authentication server 30 to the rule setting unit 201 of the print server 20 (step S6). Thereby, the print server 20 acquires the authentication process information.

Then, the rule setting unit 201 requests the authentication server 30 to acquire the option information (step S7).

In this case, in response to the request from the rule setting unit 201, the authentication server 30 transmits the option information managed in the authentication server 30 to the rule setting unit 201 of the print server 20 (step S8). Thereby, the print server 20 acquires the option information.

The option information transmitted from the authentication server 30 at step S8 includes, for example, information of all groups of users authorized to use the image forming apparatus 40, information of all application programs associated with files in printable format, and information of installation locations of the image forming apparatus 40 of the image forming system 10. The option information may further include the internet protocol (IP) address assigned to the image forming apparatus 40 and the apparatus name (e.g., printer name) of the image forming apparatus 40, for example.

Following the execution of the processes of steps S5 to S8, the rule setting unit 201 displays the rule setting screen on the display 20g in response to the request made by the administrator at step S4 (step S9). The rule setting screen may be displayed based on the authentication process information and the option information acquired from the authentication server 30, as described above.

Figure 11:
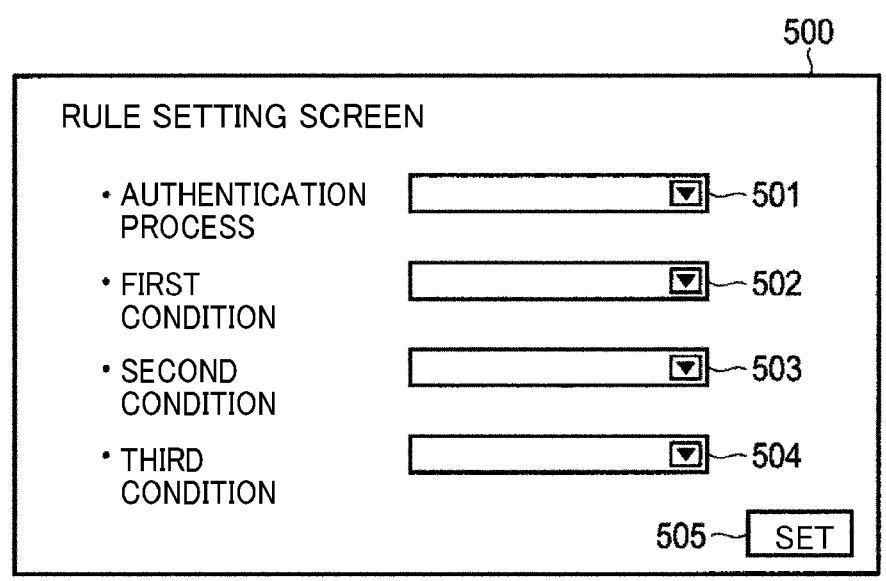
FIG. 11 is a diagram illustrating an example of a rule setting screen of the embodiment.

FIG. 11 illustrates an example of the rule setting screen displayed at step S9. As illustrated in FIG. 11, a rule setting screen 500 includes a first selection field 501, a second selection field 502, a third selection field 503, and a fourth selection field 504, for example.

The first selection field 501 is an area for selecting the authentication process to be executed for the user requesting the print job meeting the first to third conditions selected in the second to fourth selection fields 502 to 504 described below.

For example, the first selection field 501 provides a user interface enabling selection of a desired authentication process from a plurality of authentication processes based on the authentication process information acquired from the authentication server 30 as described above.

The second selection field 502 is an area for selecting the first condition (e.g., the user group) included in the change condition for changing the authentication process.

For example, the second selection field 502 provides a user interface enabling selection of a desired group from a plurality of groups based on the option information acquired from the authentication server 30 as described above, specifically the information of all groups of users authorized to use the image forming apparatus 40.

The third selection field 503 is an area for selecting the second condition (e.g., the application program) included in the change condition for changing the authentication process.

For example, the third selection field 503 provides a user interface enabling selection of a desired application program from a plurality of application programs based on the option information acquired from the authentication server 30 as described above, specifically the information of all application programs associated with files in printable format.

The fourth selection field 504 is an area for selecting the third condition (e.g., the installation location) included in the change condition for changing the authentication process.

For example, the fourth selection field 504 provides a user interface enabling selection of a desired installation location from a plurality of installation locations based on the option information acquired from the authentication server 30 as described above, specifically the information of installation locations of the image forming apparatus 40 of the image forming system 10.

On the above-described rule setting screen 500, the user group, the application, and the installation location described with FIG. 8 are selectable as the first to third conditions forming the change condition. The rule setting screen 500, however, may further include a field enabling selection of another condition.

Referring back to FIG. 10, when the above-described rule setting screen 500 is displayed at step S9, the administrator selects (i.e., specifies) the authentication process in the first selection field 501 and selects (i.e., specifies) the change condition including the first to third conditions in the second to fourth selection fields 502 to 504 by using the input device 20f of the print server 20, for example (step S10).

As illustrated in FIG. 11, the rule setting screen 500 further includes a "set" button 505, for example. If the administrator presses (i.e., specifies) the "set" button 505 after selecting the desired authentication process and first to third conditions in the first to fourth selection fields 501 to 504, the rule setting unit 201 sets the rules based on the authentication process information of the authentication process and the change condition selected by the administrator.

The rule information representing the rules thus set by the rule setting unit 201 (i.e., the rule information including the authentication process information and the change condition selected by the administrator) is stored in the rule information storing unit 202 (step S11).

Following the execution of the process of step S11, the display 20g of the print server 20 displays a message notifying that the setting of the rules (i.e., the storage of the rule information) has completed (step S12).

Figure 10:
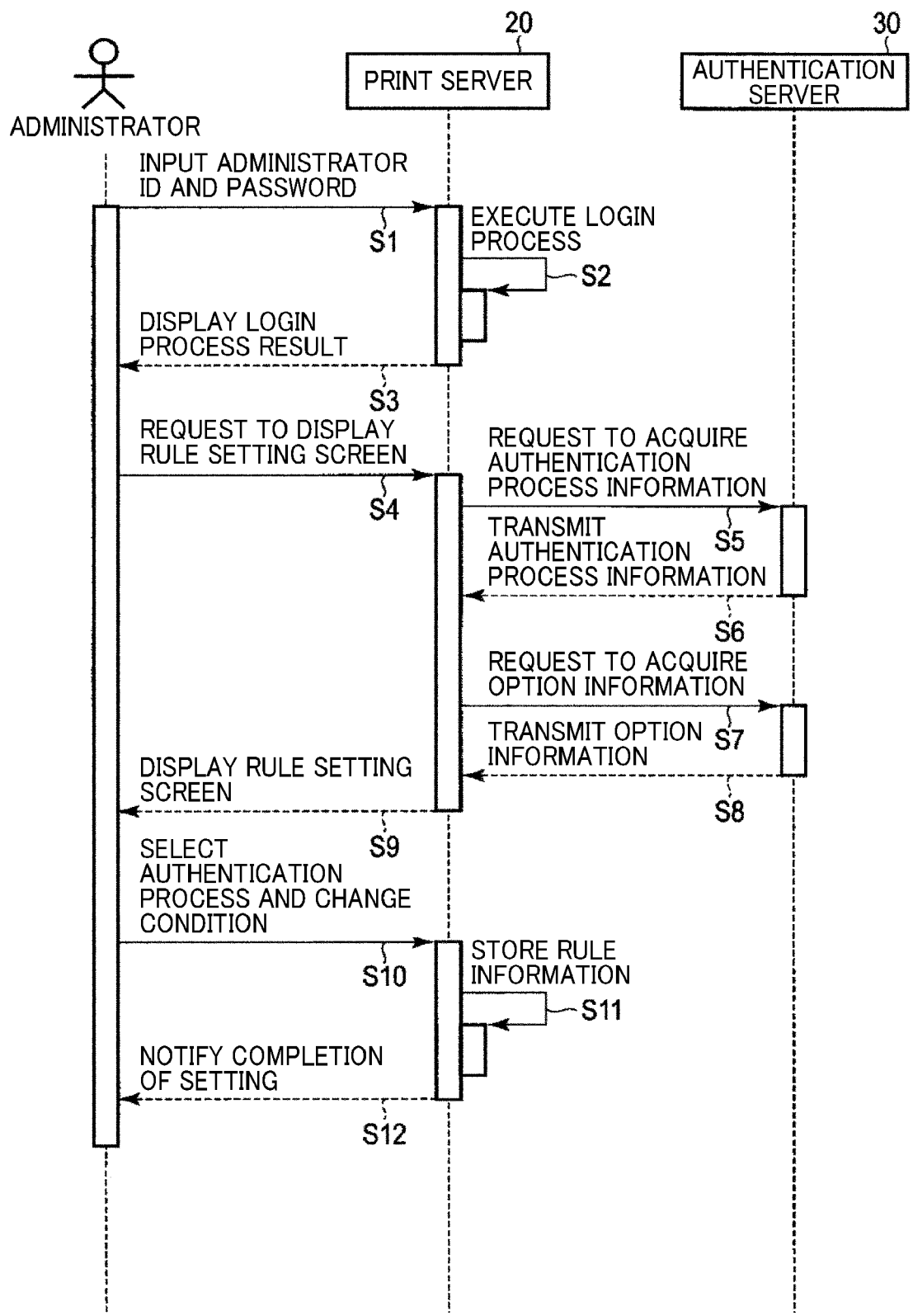
FIG. 10 is a sequence chart illustrating an example of the procedure of a rule setting process of the embodiment.

According to the above-described rule setting process illustrated in FIG. 10, the rules for changing the authentication process for the user requesting the print job meeting the change condition selected (i.e., specified) by the administrator are set in accordance with the operation performed on the print server 20 by the administrator.

It is possible, for example, to set a plurality of rules such as those illustrated in FIG. 8 (i.e., store a plurality of rule information items in the rule information storing unit 202) by repeating the processes of steps S10 and S11 illustrated in FIG. 10.

In the above-described example of FIG. 10, the authentication process information and the option information are acquired from the authentication server 30. Alternatively, for example, a part or all of the authentication process information and the option information may be managed in the print server 20, or may be acquired from an external server accessible based on a protocol called lightweight directory access protocol (LDAP) (i.e., from a directory service), for example.

An example of the procedure of the print job storage process will now be described with reference to the sequence chart of FIG. 12.

To print a file managed in the user terminal 50, for example, the user first specifies the file on the user terminal 50 to thereby request a print job for printing the file (step S21). If the image forming system 10 includes a plurality of image forming apparatuses 40, as described above, the user specifies one of the plurality of image forming apparatuses 40 to be used to print the file.

In the following description, the user requesting the print job at step S21 will be referred to as the target user, and the file printed based on the print job requested by the target user (i.e., the file specified by the target user) will be referred to as the target file.

In response to the print job request made by the target user at step S21, the user terminal 50 generates the print job and transmits the generated print job to the print server 20 (step S22).

The print job transmitted from the user terminal 50 to the print server 20 at step S22 includes, for example, the target file containing print data and bibliographical information of the target file such as the file name and the number of pages, for example. The print job is described in a language called printer job language (PJL), for example.

It is assumed here that the print job is associated with, for example, the user ID for identifying the target user, application information representing the application program associated with the target file, and the apparatus information representing the image forming apparatus 40 specified by the target user. The apparatus information includes the IP address assigned to the image forming apparatus 40 specified by the target user and the apparatus name and the installation location of the image forming apparatus 40, for example. It is assumed in the embodiment that the user ID, the application information, and the apparatus information are acquired based on the print job transmitted to the print server 20 from the user terminal 50 at step S22. The user ID, the application information, and the apparatus information may be included in the print job.

The print job managing unit 203 of the print server 20 receives the print job transmitted from the user terminal 50, to thereby receive the print job requested by the target user. The print job received by the print job managing unit 203 is stored in the print job storing unit 204 (step S23). The print job storing unit 204 stores print jobs requested by a plurality of users including the target user.

Then, the determining unit 205 acquires the rule information stored in the rule information storing unit 202. With reference to the acquired rule information, the determining unit 205 executes a condition determination process of determining whether the information related to the print job stored in the print job storing unit 204 (i.e., the print job requested by the target user) meets the change condition included in the rule information (step S24). Details of the process of step S24 will be described later.

If it is determined at step S24 that the information related to the print job meets the change condition (i.e., that the target file contains a confidential document), the determining unit 205 transmits, to the authentication server 30, the authentication process information of the rule information in association with the change condition and the user ID for identifying the target user (step S25). With the process of step S25, the print server 20 requests the authentication server 30 to increase the security strength (hereinafter simply referred to as increase in security) when the target file is printed (i.e., when the target user uses the image forming apparatus 40), for example.

Then, the authentication process setting unit 301 of the authentication server 30 receives the user ID and the authentication process information transmitted by the determining unit 205 of the print server 20. The authentication process setting unit 301 stores the received user ID and authentication process information in the authentication information storing unit 302 as the authentication information (step S26). With the process of step S26, the authentication process to be executed for the target user identified by the user ID received by the authentication process setting unit 301 is changed from the authentication process set by default to the authentication process represented by the authentication process information received by the authentication process setting unit 301. That is, the authentication process to be executed for the target user is set.

Following the execution of the process of step S26, the authentication server 30 notifies the print server 20 of the completion of setting of the authentication process to be executed for the target user in response to the request for increase in security made at step S25 (step S27).

In this case, the user terminal 50 is notified that the print job requested by the target user has been stored (step S28). The user terminal 50 displays a message notifying that the print job requested by the target user has been received (step S29).

In the above-described example, it is determined in the condition determination process of step S24 that the information related to the print job meets the change condition. If it is determined in the condition determination process that the information related to the print job does not meet the change condition, the processes of steps S28 and S29 may be executed without execution of the processes of steps S25 to S27.

Figure 12:
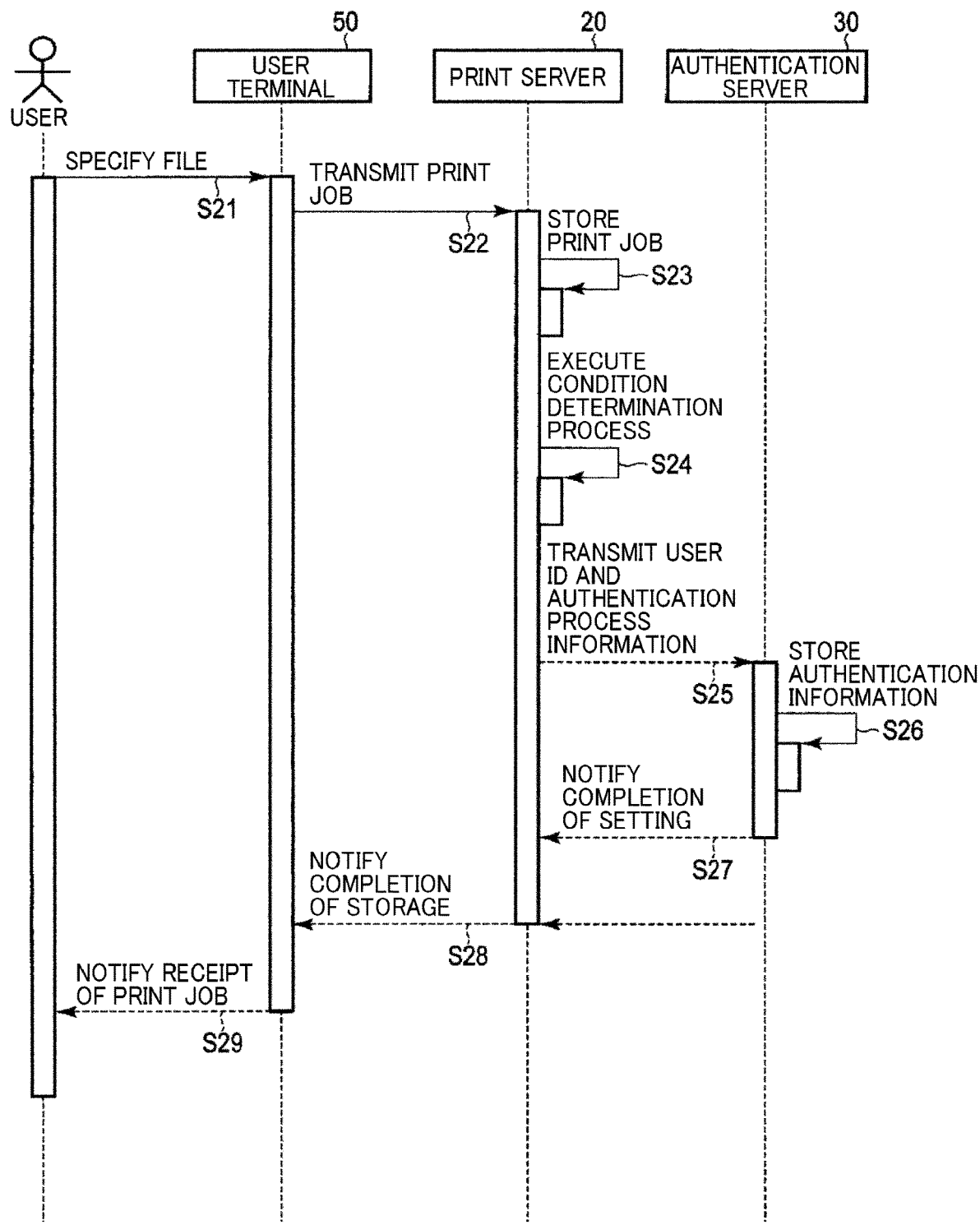
FIG. 12 is a sequence chart illustrating an example of the procedure of a print job storage process of the embodiment.

Further, in the above-described print job storage process illustrated in FIG. 12, when it is determined in the condition determination process that the information related to the print job meets the change condition, the authentication information is stored in the authentication information storing unit 302 (i.e., the authentication process to be executed for the target user is changed). Herein, users allowed to request the increase in security may be limited. In this case, the process of step S26 may be preceded by, for example, a determination (i.e., authentication) process of determining whether the target user identified by the user ID transmitted at step S25 has previously been registered as a user allowed to request the increase in security. The process of step S26 may be executed if it is determined in such a process that the target user is a previously registered user. Whether the target user is a user allowed to request the increase in security may be determined based on predetermined key input specified by the target user or a digital client certificate, for example.

An example of the procedure of the condition determination process (i.e., the process of step S24 illustrated in FIG. 12) will now be described with reference to the flowchart of FIG. 13.

As described above, the condition determination process is executed by the determining unit 205 of the print server 20 to determine whether the information related to the print job meets the change condition included in the rule information. It is assumed in the following description that the change condition included in the rule information includes the first to third conditions (e.g., the user group, the application, and the installation location) described above with reference to FIG. 8.

Based on the user ID associated with the print job requested by the target user as described above, the determining unit 205 first identifies the group to which the target user belongs (step S31).

The process of step S31 is executed based on group information that defines the relationship between the target user and the group of the target user. For example, the group information may be managed in the print server 20, or may be acquired (i.e., received) from the user terminal 50 and the authentication server 30. The group information may include, for example, the group name of the group of the target user in association with the user ID for identifying the target user.

The group of the target user may be identified based on, for example, attribute information of the target user, such as the occupation or position of the target user or the department or section to which the target user belongs.

Herein, the determining unit 205 determines whether the group of the target user identified at step S31 meets the first condition included in the change condition (step S32). At step S32, if the group identified at step S31 matches the user group set as the first condition, the determining unit 205 determines that the first condition is met. If the group identified at step S31 does not match the user group set as the first condition, the determining unit 205 determines that the first condition is not met.

If it is determined that the group identified at step S31 meets the first condition (YES at step S32), the determining unit 205 identifies the application program associated with the target file based on the application information associated with the print job requested by the target user (step S33).

If the format (i.e., type) of the target file is a document file format, the application program associated with the target file is a document preparation application for preparing a document. If the format of the target file is an electronic mail format, the application program associated with the target file is a mailer (i.e., electronic mail software) that manages electronic mail. The application programs described here are illustrative, and the application program identified at step S33 may be any other application program capable of handling the target file.

The determining unit 205 determines whether the application program identified at step S33 meets the second condition included in the change condition (step S34). At step S34, if the application program identified at step S33 matches the application program set as the second condition, the determining unit 205 determines that the second condition is met. If the application program identified at step S33 does not match the application program set as the second condition, the determining unit 205 determines that the second condition is not met.

If it is determined that the application program identified at step S33 meets the second condition (YES at step S34), the determining unit 205 identifies the installation location of the image forming apparatus 40 specified by the target user (i.e., the image forming apparatus 40 that is to print the target file) based on the apparatus information associated with the print job requested by the target user (step S35).

The installation location of the image forming apparatus 40 specified by the target user may be the office, headquarter, or public place, for example, but may be another place.

The determining unit 205 determines whether the installation location identified at step S35 meets the third condition included in the change condition (step S36). At step S36, if the installation location identified at step S35 matches the installation location set as the third condition, the determining unit 205 determines that the third condition is met. If the installation location identified at step S35 does not match the installation location set as the third condition, the determining unit 205 determines that the third condition is not met.

If it is determined that the installation location identified at step S35 meets the third condition (YES at step S36), the determining unit 205 determines that the information related to the print job requested by the target user meets the change condition, and acquires the authentication process information of the rule information in association with the change condition (i.e., the first to third conditions) (step S37).

The authentication process information acquired at step S37 is transmitted to the authentication server 30 at step S25 in FIG. 12 together with the user ID associated with the print job requested by the target user (i.e., the user ID for identifying the target user).

Figure 13:
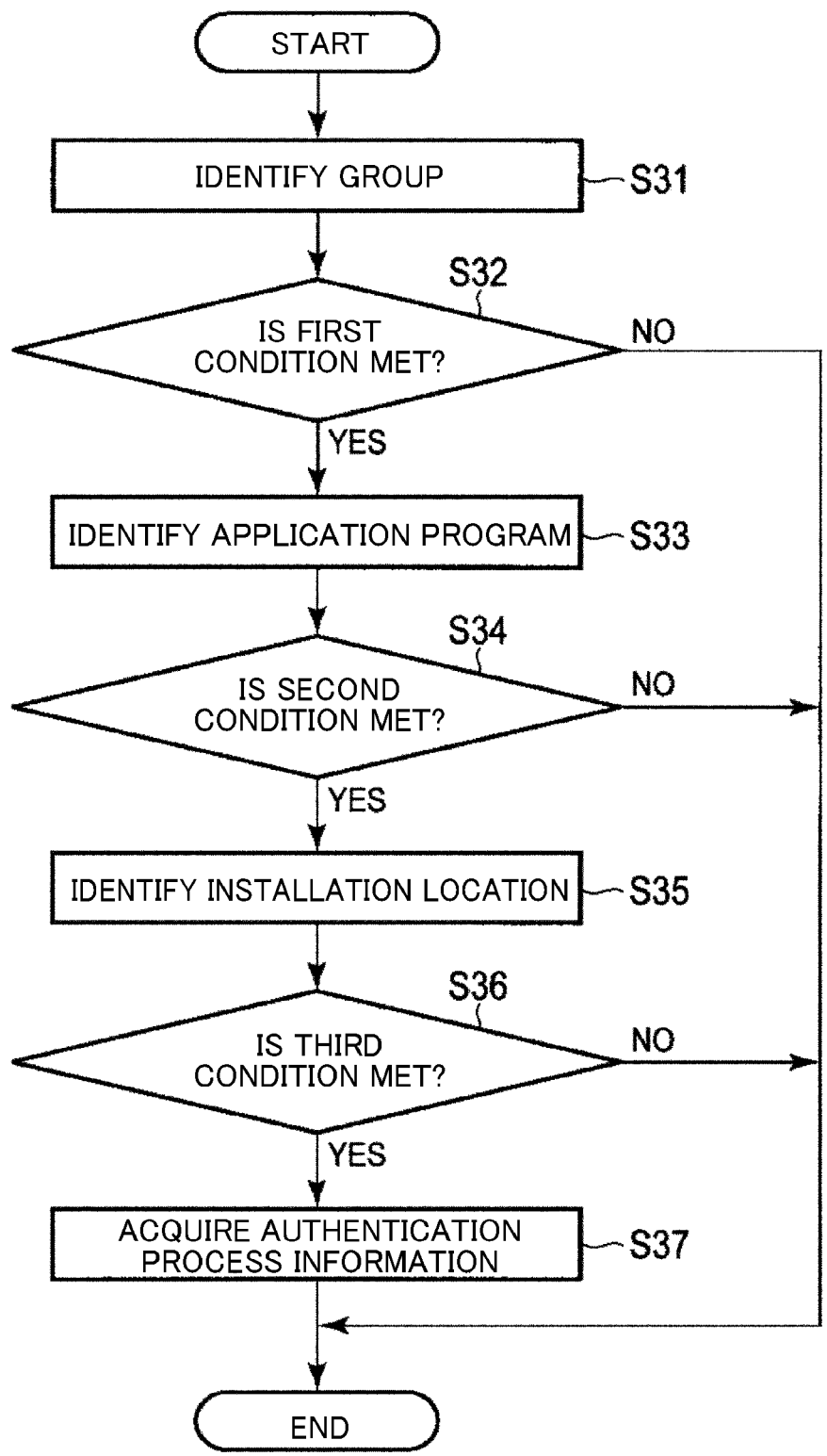
FIG. 13 is a flowchart illustrating an example of the procedure of a condition determination process of the embodiment.

If it is determined that the group identified at step S31 does not meet the first condition (NO at step S32), the condition determination process illustrated in FIG. 13 is completed. If it is determined that the application program identified at step S33 does not meet the second condition (NO at step S34), or if it is determined that the installation location identified at step S35 does not meet the third condition (NO at step S36), the condition determination process in FIG. 13 is similarly completed.

According to the above-described condition determination process, if the group of the target user, the application program associated with the target file, and the installation location of the image forming apparatus 40 specified by the target user meet all of the first to third conditions included in the change condition, the information related to the print job requested by the target user is determined to meet the change condition. Then, the print server 20 transmits the request for increase in security to the authentication server 30.

In the above-described example of FIG. 13, if all of the first to third conditions included in the change condition are met, it is determined that the change condition is met. Alternatively, for example, it may be determined that the change condition is met if at least one of the first to third conditions is met.

Further, if a plurality of rule information items are stored in the rule information storing unit 202, as described above with reference to FIG. 8, the condition determination process illustrated in FIG. 13 is executed for each of the plurality of rule information items. In this case, the condition determination process may be completed when the change condition included in one of the plurality of rule information items is met.

In the above-described embodiment, the user group is set as the first condition (i.e., the condition related to the user). For example, however, the user ID for identifying the target user may be set as the first condition. In this case, it may be determined that the first condition is met when the user ID for identifying the target user matches the user ID set as the first condition.

Further, in the above-described embodiment, the application program is set as the second condition (i.e., the condition related to the file). For example, however, a specific term may be set as the second condition. In this case, it may be determined that the second condition is met when the target file and the file name thereof include the term set as the second condition.

Further, in the above-described embodiment, the installation location is set as the third condition (i.e., the condition related to the image forming apparatus 40). For example, however, the IP address assigned to the image forming apparatus 40 or the apparatus name of the image forming apparatus 40 may be set as the third condition. In this case, it may be determined that the third condition is met when the IP address or apparatus name of the image forming apparatus 40 specified by the target user matches the IP address or apparatus name set as the third condition.

That is, it is possible in the embodiment to set various conditions as the rules (i.e., change condition) for changing the authentication process to be executed for the target user.

An example of the procedure of the file printing process will now be described with reference to the sequence chart of FIG. 14.

As described above, after the print job requested by the target user is stored in the print job storing unit 204 of the print server 20, the target user instructs execution of the print job (i.e., the printing process) by operating the image forming apparatus 40 specified by the target user, to thereby print the target file based on the print job.

For example, it is assumed here that the target user has an IC card distributed to the target user to use the image forming apparatus 40. The IC card is an information storage medium, and is assumed here to store the user ID for identifying the target user having the IC card.

Further, the image forming apparatus 40 is assumed to include a card reader (i.e., a reading device) for reading information stored in the IC card.

In this case, the target user brings the IC card close to the card reader of the image forming apparatus 40. Thereby, the authentication managing unit 402 of the image forming apparatus 40 is capable of reading the user ID stored in the IC card (step S41).

It is assumed in the following description of the embodiment that the authentication managing unit 402 reads the user ID stored in the IC card. Alternatively, the authentication managing unit 402 may acquire the user ID directly input by the target user on the operation panel 41g of the operation device 41 of the image forming apparatus 40.

The authentication managing unit 402 transmits the user ID read (i.e., acquired) from the IC card at step S41 to the authentication server 30, to thereby request authentication of the target user (i.e., the authentication process for the target user) (step S42).

Then, in response to the request transmitted from the authentication managing unit 402 of the image forming apparatus 40 at step S42, the authentication server 30 executes the authentication process for the target user (step S43). The process of step S43 uses the user ID transmitted by the authentication managing unit 402. Details of the process of step S43 will be described later.

Following the execution of the process of step S43, the authentication server 30 notifies the operation device 41 of the image forming apparatus 40 of an authentication result of the process of step S43 (step S44). Then, the UI display unit 401 of the image forming apparatus 40 displays the authentication result (step S45).

The authentication result transmitted from the authentication server 30 to the image forming apparatus 40 at step S44 indicates authentication success or failure. The authentication success indicates that the authentication of the target user has succeeded (i.e., the target user has been authenticated). The authentication failure indicates that the authentication of the target user has failed (i.e., the target user has failed to be authenticated).

Figure 14:
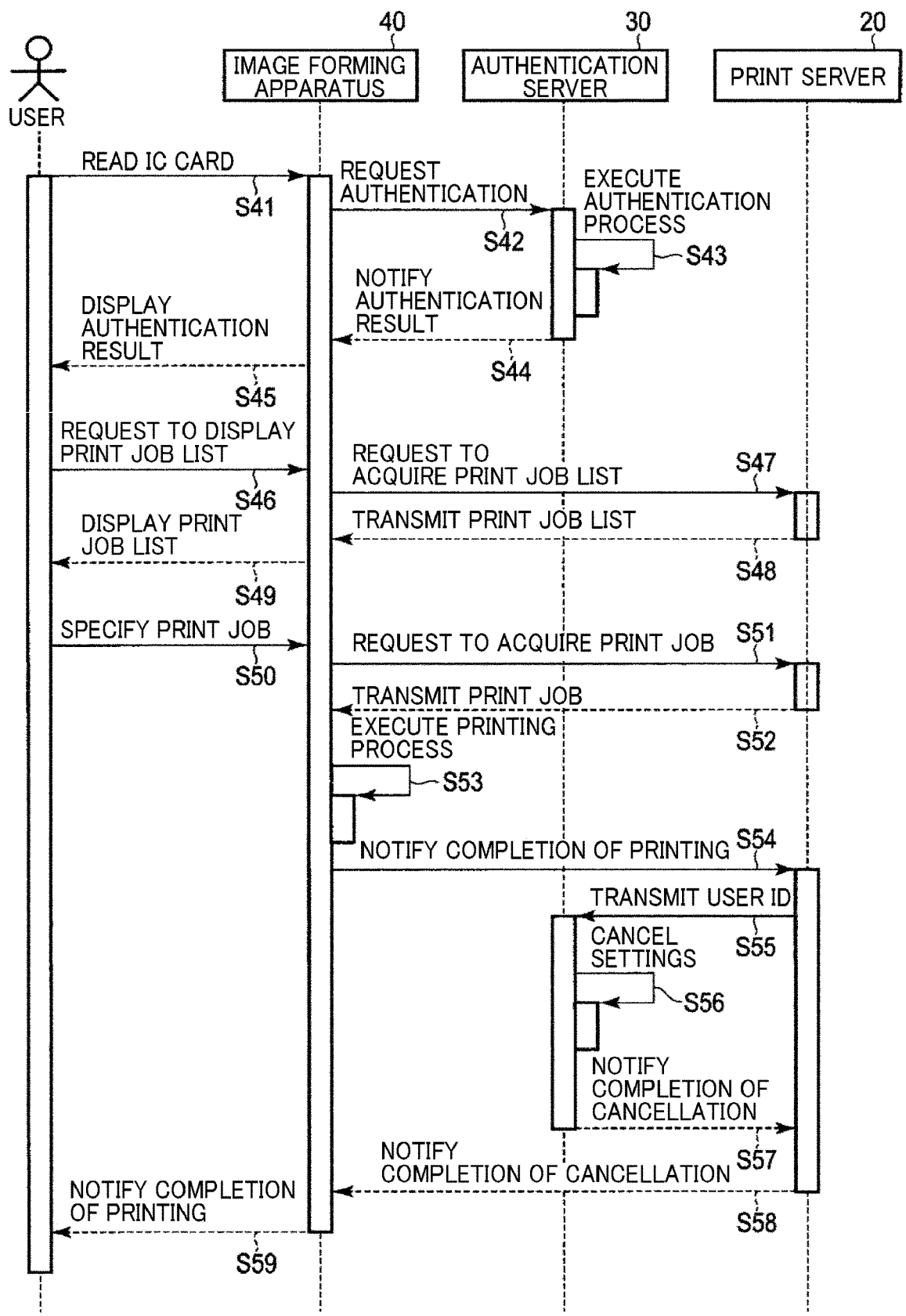
FIG. 14 is a sequence chart illustrating an example of the procedure of a file printing process of the embodiment.

If the authentication result displayed by the UI display unit 401 indicates the authentication failure, the file printing process illustrated in FIG. 14 is completed.

If the authentication result displayed by the UI display unit 401 indicates the authentication success, the target user is allowed to use the image forming apparatus 40. In this case, the user ID for identifying the target user and later-described print authorization are transmitted to the main device 42 (e.g., the printing unit 404) from the operation device 41 (e.g., the authentication managing unit 402).

In this case, the target user requests the image forming apparatus 40 to display a print job list by operating the operation panel 41*g* of the operation device 41 of the image forming apparatus 40, for example (step S46).

In response to the execution of the process of step S46, the print managing unit 403 of the image forming apparatus 40 transmits the user ID for identifying the target user to the print server 20, to thereby request the print server 20 to acquire the print job list (step S47).

In this case, with reference to the print job storing unit 204, the print job managing unit 203 of the print server 20 generates the print job list. The print job list is a list of print jobs associated with the user ID transmitted by the print managing unit 403 and the apparatus information representing the image forming apparatus 40 used by the target user (i.e., print jobs received from the target user). The print job list generated by the print job managing unit 203 is transmitted to the image forming apparatus 40 from the print server 20 (step S48).

The print job list transmitted from the print server 20 at step S48 is displayed by the UI display unit 401 of the image forming apparatus 40 in response to the request made by the target user at step S46 (step S49).

The print job list displayed at step S49 includes, for example, print job information, which is identification information for identifying the print job. In this case, the target user operates the operation panel 41*g* of the operation device 41 of the image forming apparatus 40 to specify, from the print job list of print jobs, the print job including the target file to be printed with the image forming apparatus 40 (step S50). Thereby, an instruction to execute the print job for printing the target file is issued to the image forming apparatus 40. The print job information included in the print job list may be the file name of the target file included in the print job identified by the print job information, or may be an ID assigned to the print job, for example.

Following the execution of the process of step S50, the print managing unit 403 of the image forming apparatus 40 transmits the print job information specified by the target user to the print server 20 as described above, to thereby request the print server 20 to acquire the print job (step S51).

In this case, the print job managing unit 203 of the print server 20 acquires from the print job storing unit 204 the print job identified by the print job information transmitted by the print managing unit 403. The print job acquired by the print job managing unit 203 is transmitted to the image forming apparatus 40 from the print server 20 (step S52).

In the image forming apparatus 40, the print managing unit 403 instructs the printing unit 404 to execute the printing process based on the print job transmitted from the print server 20. In response to the instruction from the print managing unit 403, the printing unit 404 executes the printing process of the target file (step S53). The printing process (i.e., printing of the target file) is executed based on the aforementioned print authorization (i.e., print parameters), for example. The print authorization may be set for the target user, the target file, or the image forming apparatus 40, for example.

Following the execution of the process of step S53, the image forming apparatus 40 notifies the print server 20 of the completion of the printing process of the target file (step S54). At step S54, the image forming apparatus 40 transmits to the print server 20 the print job information for identifying the completed print job (i.e., the information of the print job specified from the print job list by the target user).

The print server 20 receives the print job information transmitted from the image forming apparatus 40. The print server 20 acquires from the print job storing unit 204 the print job identified by the received print job information, and transmits the user ID associated with the acquired print job (i.e., the user ID for identifying the target user) to the authentication server 30 (step S55). With this process of step S55, the print server 20 requests the authentication server 30 to cancel the increase in security.

Then, the authentication process setting unit 301 of the authentication server 30 receives the user ID transmitted by the print server 20. The authentication process setting unit 301 cancels the settings of the authentication process for the target user identified by the received user ID (step S56). For example, at step S56, the authentication process setting unit 301 deletes (i.e., discards) from the authentication information storing unit 302 the authentication information including the received user ID.

Following the execution of the process of step S56, the authentication server 30 notifies the print server 20 of the completion of cancellation of the increase in security in response to the request made at step S55 (step S57). Following the execution of the process of step S57, the print job managing unit 203 of the print server 20 discards the print job requested by the target user (i.e., the print job associated with the user ID for identifying the target user) from the print job storing unit 204.

The completion of cancellation of the increase in security is further notified to the image forming apparatus 40 from the print server 20 (step S58). Following the execution of the process of step S58, the UI display unit 401 displays a message notifying the completion of the printing (step S59).

The above-described file printing process enables the target file included in the print job received from the target user to be printed with the image forming apparatus 40 used by the target user authenticated by the authentication process.

In the above-described example, the IC card stores the user ID. Alternatively, the IC card may store a card ID, which is identification information assigned to the IC card. In this case, the corresponding relationship between the card ID read from the IC card and the user ID for identifying the target user having the IC card assigned with the card ID is managed in the authentication server 30, for example, making the user ID identifiable from the card ID.

Figure 15:
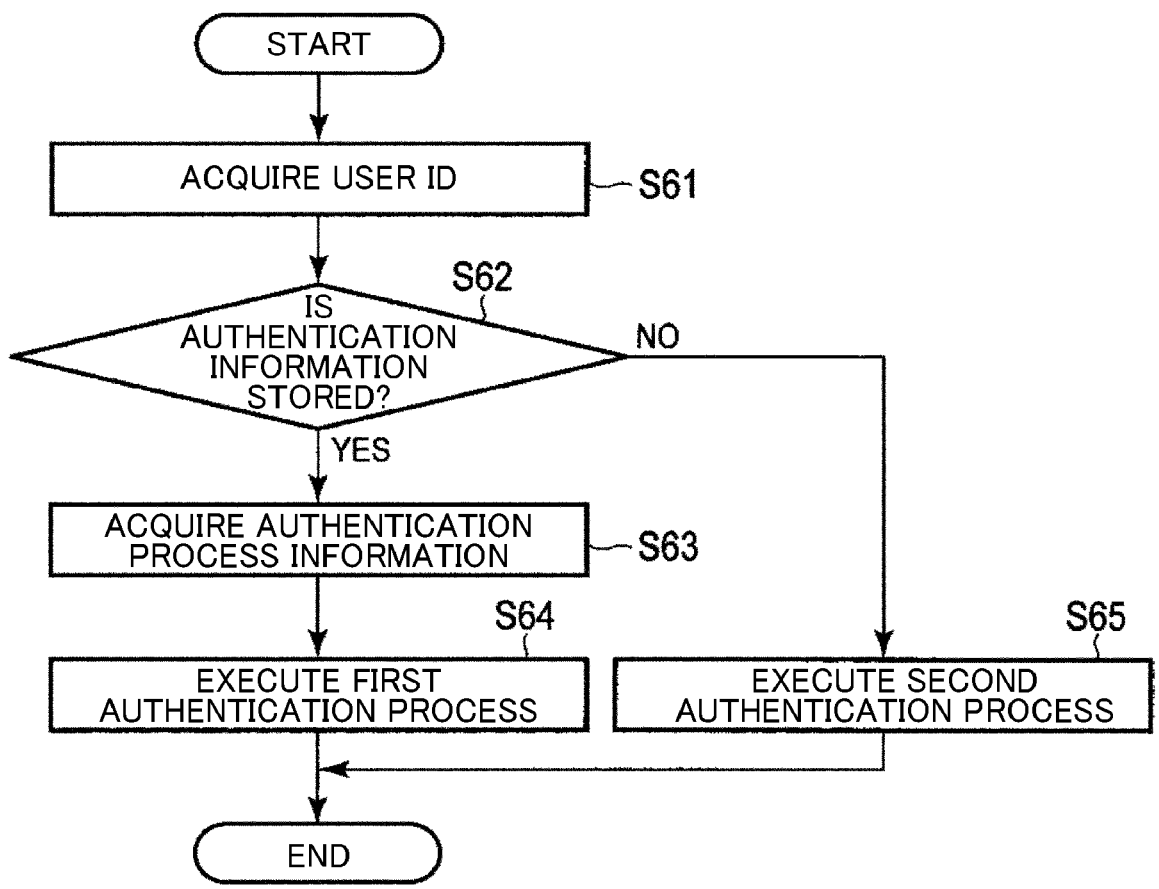
FIG. 15 is a flowchart illustrating an example of the procedure of an authentication process of the embodiment.

An example of the procedure of the authentication process (i.e., the process of step S43 illustrated in FIG. 14) will now be described with reference to the flowchart of FIG. 15.

The authentication process is a process executed by the authentication server 30 to determine whether the user has authority (i.e., is authorized) to use the image forming apparatus 40, for example.

The authentication process determining unit 303 of the authentication server 30 first acquires the user ID transmitted by the authentication managing unit 402 of the image forming apparatus 40 (i.e., the user ID acquired from the IC card) (step S61).

Then, based on the user ID acquired at step S61, the authentication process determining unit 303 determines whether the authentication information including the user ID is stored in the authentication information storing unit 302 (step S62). In other words, it is determined at step S62 whether the security strength is increased for the target user identified by the user ID acquired at step S61.

If it is determined at step S62 that the authentication information including the user ID is stored in the authentication information storing unit 302 (YES at step S62), the authentication process determining unit 303 acquires the authentication process information included in the authentication information (i.e., the authentication process information associated with the user ID) (step S63). Following the execution of the process of step S63, the authentication process determining unit 303 determines the authentication process represented by the authentication process information acquired at step S63 (hereinafter referred to as the first authentication process) as the authentication process to be executed for the target user.

In this case, the authentication unit 304 executes the first authentication process determined by the authentication process determining unit 303 (step S64).

If it is determined at step S62 that the authentication information including the user ID is not stored in the authentication information storing unit 302 (NO at step S62), the authentication process determining unit 303 determines the authentication process set by default, for example (hereinafter referred to as the second authentication process), as the authentication process to be executed for the target user.

In this case, the authentication unit 304 executes the second authentication process determined by the authentication process determining unit 303 (step S65).

The first authentication process executed at step S64 and the second authentication process executed at step S65 will now be specifically described.

As described above, the first authentication process represented by the authentication process information included in the authentication information is higher in security strength than the second authentication process set by default.

In this case, the first authentication process is a multifactor authentication process combining the IC card authentication process and the passcode authentication process, for example. Further, the second authentication process is the IC card authentication process, for example. The IC card authentication process is an authentication process based on the user ID (or the card ID) acquired from the IC card (i.e., the information storage medium). The passcode authentication process is an authentication process based on the passcode input by the user. The term "passcode" used in the embodiment is a concept including password and personal identification number.

In the following description, the user ID acquired step S61 (i.e., the user ID acquired from the IC card) will be referred to as the target user ID for convenience.

It is assumed here that information for use in the authentication process, such as the user ID for identifying each of user allowed to use the image forming apparatus 40 (hereinafter referred to as the authorized user ID) and the passcode assigned to the user, is previously set (i.e., managed) in the authentication server 30.

A description will first be given of a case in which the first authentication process (e.g., the combination of the IC card authentication process and the passcode authentication process) is executed at step S64.

The first authentication process is executed with the passcode for the passcode authentication process. The authentication unit 304 therefore notifies the image forming apparatus 40 that the passcode should be input to authenticate the target user (i.e., that an authentication parameter is missing).

Notified by the authentication server 30 that the passcode should be input, the UI display unit 401 of the image forming apparatus 40 displays a passcode input screen for inputting the passcode. If the passcode is input on the passcode input screen by the target user, the authentication managing unit 402 of the image forming apparatus 40 transmits the input passcode to the authentication server 30.

Then, the authentication unit 304 of the authentication server 30 executes the first authentication process with the target user ID acquired from the IC card and the input passcode transmitted by the authentication managing unit 402 of the image forming apparatus 40. In the first authentication process, the IC card authentication process is executed based on the target user ID, and the passcode authentication process is executed based on the input passcode, as described above.

Specifically, the IC card authentication process determines whether the target user ID is the authorized user ID. The passcode authentication process determines whether the input passcode is the passcode assigned to the target user.

If it is determined in the IC card authentication process that the target user ID is the authorized user ID, and if it is determined in the passcode authentication process that the input passcode is the passcode assigned to the target user, the authentication result of the first authentication process indicates authentication success.

If it is determined in the IC card authentication process that the target user ID is not the authorized user ID, or if it is determined in the passcode authentication process that the input passcode is not the passcode assigned to the target user, the authentication result of the first authentication process indicates authentication failure.

A description will now be given of a case in which the second authentication process (e.g., the IC card authentication process) is executed at step S65.

When the IC card authentication process is executed as the second authentication process, as described above, the authentication unit 304 executes the IC card authentication process with the target user ID acquired from the IC card. As described above, the IC card authentication process determines whether the target user ID is the authorized user ID.

If it is determined in the IC card authentication process that the target user ID is the authorized user ID, the authentication result of the second authentication process indicates authentication success. If it is determined in the IC card authentication process that the target user ID is not the authorized user ID, the authentication result of the second authentication process indicates authentication failure.

As described above, according to the print job storage process illustrated in FIG. 12, if the information related to the print job requested by the target user (e.g., the group of the target user, the application program associated with the file to be printed based on the print job, and the installation location of the image forming apparatus 40 that is to print the file based on the print job) meets the previously determined change condition included in the rule information, the authentication information is stored in the authentication information storing unit 302 of the authentication server 30. Further, according to the authentication process illustrated in FIG. 15, if the authentication information including the user ID for identifying the target user is stored in the authentication information storing unit 302, the first authentication process represented by the authentication process information included in the authentication information is executed. If the authentication information is not set, the second authentication process set by default is executed.

That is, in the embodiment, the first authentication process is executed for the target user when the information related to the print job requested by the target user meets the change condition, and the second authentication process is executed for the target user when the information related to the print job does not meet the change condition, as described above.

With this configuration, the embodiment enables execution of at least partly different authentication processes depending on the print job requested by the target user (i.e., enables change in the authentication process).

In the embodiment, the first authentication process is higher in security strength (i.e., security level) than the second authentication process. Specifically, the first authentication process is a combination of at least two or more of a plurality of predetermined authentication processes (e.g., the IC card authentication process and the passcode authentication process), and the second authentication process is at least one of the plurality of authentication processes (e.g., the IC card authentication process).

With this configuration, the embodiment enables execution of the first authentication process of higher security strength when the change condition is met, and enables execution of the second authentication process of lower security strength (i.e., higher convenience) when the change condition is not met, for example, thereby making the security strength (or convenience) flexibly changeable depending on the print job.

Further, in the embodiment, when requesting the print job, the target user performs an ordinary operation, such as specifying the target file. That is, the embodiment enables flexible change in the security strength (or convenience) without requesting the target user to perform a special operation.

Further, in the above-described embodiment, the first authentication process is an authentication process of higher security strength, and the second authentication process is an authentication process of lower security strength (i.e., higher convenience). It suffices, however, if the first authentication process and the second authentication process are at least partly different authentication processes.

That is, the second authentication process may be higher in security strength than the first authentication process. Further, the first authentication process may be one authentication process, not a combination of a plurality of authentication processes, and the second authentication process may be a combination of a plurality of authentication processes. Further, the first authentication process and the second authentication process may have similar levels of security strength (or convenience), as long as the first authentication process and the second authentication process are at least partly different authentication processes.

Further, in the embodiment, the change condition includes at least one of the first condition related to the user (e.g., the user group), the second condition related to the file to be printed based on the print job (e.g., the application program), and the third condition related to the image forming apparatus 40 that is to print the file (e.g., the installation location). Further, in the embodiment, the change condition is specified (i.e., set) by the administrator of the image forming system 10, for example.

With this configuration, the embodiment enables change in the security strength according to the intension of the administrator, for example.

In the above-described embodiment, the change condition is specified in response to the operation performed on the print server 20 by the administrator of the image forming system 10. Alternatively, the change condition may be specified in response to the operation performed on the authentication server 30 by the administrator or the operation performed on the image forming apparatus 40 by the administrator or the user, for example.

Further, in the embodiment, the first authentication process is set for the target user when the information related to the print job is determined to meet the change condition, and the settings of the first authentication process for the target user are cancelled after the printing process based on the print job is completed. With this configuration, it is possible to increase the security strength for the target user (i.e., set the first authentication process for the target user) and reset the increased security strength when printing a file based on the next print job, for example, to execute the second authentication process.

In the above-described embodiment, the settings of the first authentication process (i.e., the increase in security) for the target user are cancelled after the printing process based on the print job requested by the target user is completed. If the print job storing unit 204 of the print server 20 stores a plurality of print jobs requested by the target user, for example, the settings of the authentication process for the target user may be maintained until the printing processes based on all print jobs corresponding to the user ID for identifying the target user are completed. Further, the authentication information may include the print job information, which is the identification information for identifying the print job. That is, the authentication process may be set not for each user but for each print job. With this configuration, when the printing process based on the print job is completed, only the settings of the authentication process for the print job are cancelled.

Further, in the embodiment, the first authentication process may be set and executed for the target user when the target user is a previously registered user. That is, the embodiment may be configured to limit the sources of requests for the increase in security, instead of receiving such requests from all users.

In the above-described embodiment, the print server 20 and the authentication server 30 are separate apparatuses. As described above, however, the print server 20 and the authentication server 30 may be implemented as one apparatus (i.e., one information processing apparatus), or may be implemented as three or more apparatuses (i.e., three or more information processing apparatuses).

Further, in the above-described embodiment, the print server 20 and the authentication server 30 include the functional units illustrated in FIG. 5 and the functional units illustrated in FIG. 6, respectively. Alternatively, the functional units of the print server 20 may be at least partially included in the authentication server 30, or the functional units of the authentication server 30 may be at least partially included in the print server 20, for example.

Further, in the above-described embodiment, the image forming system 10 includes the print server 20, the authentication server 30, and the image forming apparatus 40. Alternatively, for example, the image forming apparatus 40 may have the functions of the print server 20 and the authentication server 30 such that the image forming apparatus 40 implements the image forming system 10 described above in the embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An information processing apparatus, comprising:
    circuitry configured to
        receive information related to a print job requested by a user,
        determine whether the received information related to the print job meets at least one previously determined condition, wherein the at least one previously determined condition includes at least one of a first condition indicating a type of a file to be printed through execution of the print job, and a second condition indicating an attribute of an image forming apparatus,
        when the user requests the image forming apparatus to execute the print job, and it is determined that the received information related to the print job meets the at least one previously determined condition, execute a first authentication process for the user, and
        when the user requests the image forming apparatus to execute the print job, and it is determined that the received information related to the print job fails to meet the at least one previously determined condition, execute a second authentication process for the user, the second authentication process being different at least partly from the first authentication process.

2. The information processing apparatus of claim 1, wherein the first authentication process executed by the circuitry is higher in security strength than the second authentication process.

3. The information processing apparatus of claim 2, wherein the circuitry is further configured to execute, as the first authentication process, at least two or more authentication processes of a plurality of authentication processes, and
    wherein the circuitry is further configured to execute, as the second authentication process, at least one authentication process of the plurality of authentication processes.

4. The information processing apparatus of claim 3, wherein the circuitry is further configured to execute, as the first authentication process, an authentication process based on user identification information acquired from an information storage medium used by the user, and an authentication process based on a passcode or password input by the user, and
    wherein the circuitry is further configured to execute, as the second authentication process, the authentication process based on the user identification information acquired from the information storage medium used by the user.

5. The information processing apparatus of claim 1,
    wherein when an application program associated with the file is an application program set in the first condition, the circuitry is further configured to determine that the first condition is met, and
    wherein when the image forming apparatus is installed at an installation location set in the second condition, the circuitry is further configured to determine that the second condition is met.

6. The information processing apparatus of claim 1, wherein when the information related to the print job meets the at least one previously determined condition, the circuitry is further configured to set and execute the first authentication process for the user, and cancel settings of the first authentication process for the user after the print job is executed in the image forming apparatus, and
    wherein when the information related to the print job fails to meet the at least one previously determined condition, the circuitry is further configured to set and execute the second authentication process for the user.

7. The information processing apparatus of claim 1, wherein when the information related to the print job meets the at least one previously determined condition and the user is a previously registered user, the circuitry is further configured to execute the first authentication process.

8. The information processing apparatus of claim 1, wherein the circuitry is further configured to receive the print job, and determine whether the received information related to the print job meets the at least one previously determined condition, after receiving the print job.

9. The information processing apparatus of claim 1, wherein the received information related to the print job is included in the print job, and is received from a user terminal.

10. The information processing apparatus of claim 1, wherein when an application program associated with the file is an application program set in the first condition, the circuitry is further configured to determine that the first condition is met.

11. The information processing apparatus of claim 1, wherein when the image forming apparatus is installed at an installation location set in the second condition, the circuitry is further configured to determine that the second condition is met.

12. The information processing apparatus of claim 1, wherein the circuitry is further configured to analyze the at least one of the first condition indicating the type of the file and the second condition indicating the attribute of the image forming apparatus to determine which of the first authentication process and the second authentication process should be executed.

13. An image forming system, comprising:
    an image forming apparatus configured to execute a print job requested by a user; and
    an information processing apparatus communicably connected to the image forming apparatus,
    in response to a request from the user using the image forming apparatus, the image forming system is configured to
        transmit a request to authenticate the user from the image forming apparatus to the information processing apparatus, execute a first authentication process in the information processing apparatus when identification information related to the user is stored in the information processing apparatus, execute a second authentication process in the information processing apparatus when the identification information related to the user is absent in the information processing apparatus, the second authentication process being different at least partly from the first authentication process, and execute printing of the print job in the image forming apparatus based on an authentication result transmitted to the image forming apparatus from the information processing apparatus.

14. A non-transitory recording medium storing a plurality of instructions which, when executed by one or more processors, cause the processors to perform an information processing method comprising:

receiving information related to a print job requested by a user;

determining whether the information related to the print job meets at least one previously determined condition, wherein the at least one previously determined condition includes at least one of a first condition related to a file to be printed through execution of the print job, and a second condition related to an image forming apparatus;

when the user requests the image forming apparatus to execute the print job, the method further comprising:

executing a first authentication process for the user when it is determined in the determining step that the information related to the print job meets the at least one previously determined condition; and executing a second authentication process for the user when it is determined in the determining step that the information related to the print job fails to meet the at least one previously determined condition, the second authentication process being different at least partly from the first authentication process.

* * * * *